No. 746,393. PATENTED DEC. 8, 1903.
C. B. SHAW.
AUTOMATIC VALVE.
APPLICATION FILED APR. 9, 1903.
NO MODEL. 2 SHEETS—SHEET 1.
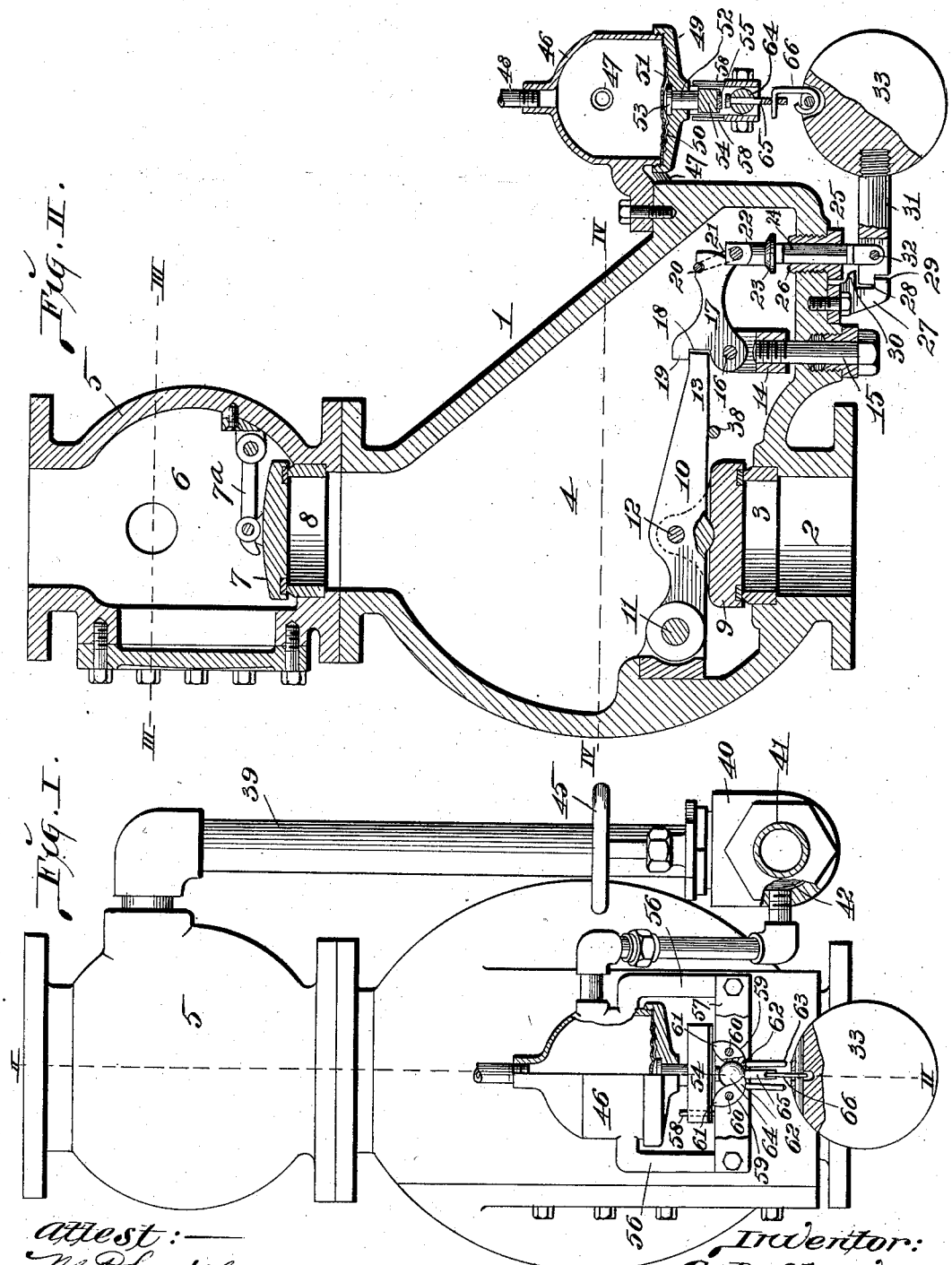

No. 746,393. PATENTED DEC. 8, 1903.
C. B. SHAW.
AUTOMATIC VALVE.
APPLICATION FILED APR. 9, 1903.
NO MODEL. 2 SHEETS—SHEET 2.
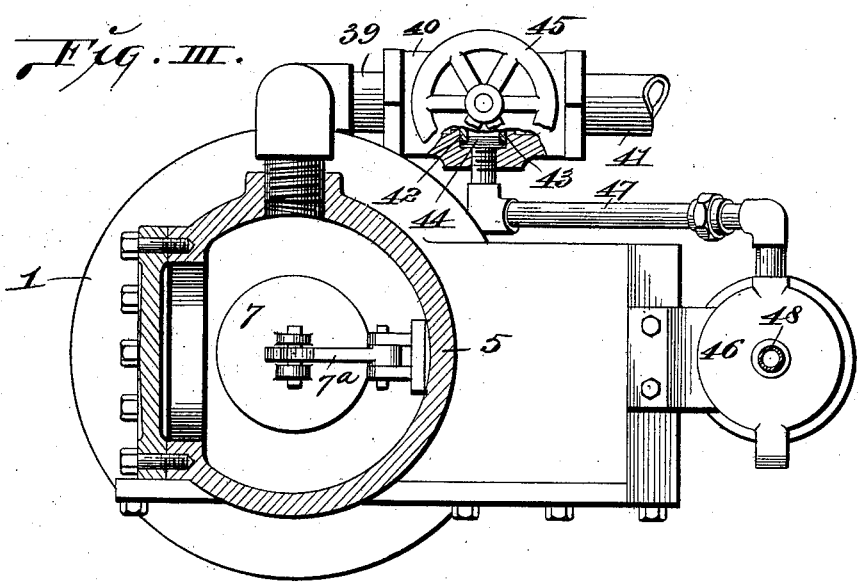
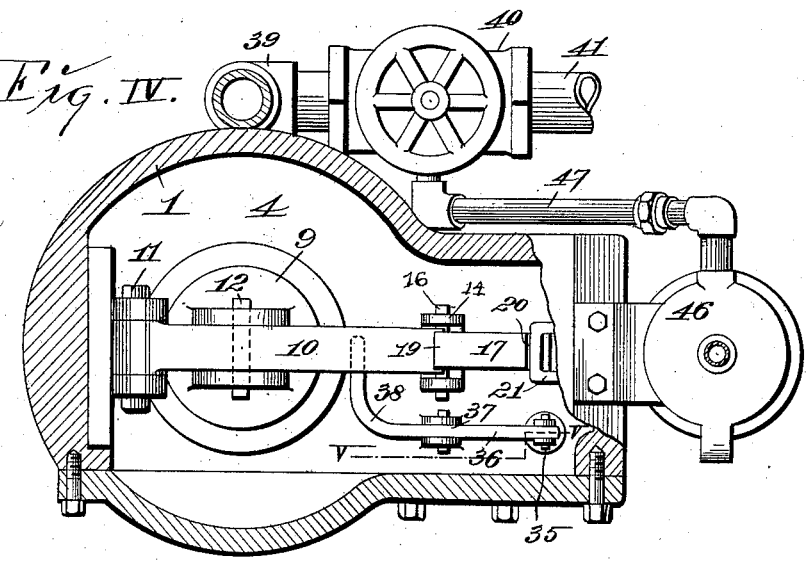
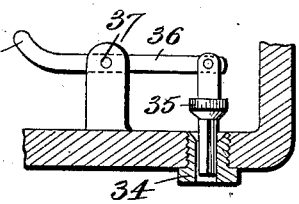
Attest:
M. P. Smith
E. S. Knight
Inventor:
C. B. Shaw.
By Wright Bro.
atty's.

No. 746,393. Patented December 8, 1903.

UNITED STATES PATENT OFFICE.

CAMPBELL B. SHAW, OF KIRKWOOD, MISSOURI, ASSIGNOR TO SHAW MANUFACTURING COMPANY, OF ST. LOUIS, MISSOURI, A CORPORATION.

AUTOMATIC VALVE.

SPECIFICATION forming part of Letters Patent No. 746,393, dated December 8, 1903.

Application filed April 9, 1903. Serial No. 151,824. (No model.)

*To all whom it may concern:*

Be it known that I, CAMPBELL B. SHAW, a citizen of the United States, residing in Kirkwood, in the county of St. Louis and State of Missouri, have invented certain new and useful Improvements in Automatic Valves, of which the following is a full, clear, and exact description, reference being had to the accompanying drawings, forming part of this specification.

My invention relates to valves for controlling the passage of water to the distributing-pipes in fire-extinguishing systems.

The invention consists in features of novelty hereinafter fully described, and pointed out in the claims.

Figure I is an elevation of my valve with parts shown in vertical section. Fig. II is a vertical section taken on line II II, Fig. I. Fig. III is a view, partly in plan and partly in horizontal section, taken on line III III, Fig. II. Fig. IV is a horizontal section taken on line IV IV, Fig. II, with the parts beneath said line shown in plan. Fig. V is a vertical section taken on line V V, Fig. IV.

1 designates a main housing, which may be of any desirable shape and is adapted to be connected to a water-main that leads to an inlet 2, located at the bottom of the housing. 3 is a valve-seat that is positioned in the inlet 2.

4 is a main water-chamber, and 5 is a pressure-chamber housing that contains a pressure-chamber 6. Communication between the pressure-chamber and the inlet-chamber is controlled by a check-valve 7, that is adapted to rest on a valve-seat 8 and is carried by a pivoted arm 7ª.

9 designates the main valve which controls the inlet 2 by resting upon the valve-seat 3. The valve 9 is carried by a swinging arm 10, pivoted at 11 to the housing and connected at 12 to the valve. The free end of the arm 10 extends beyond the valve 9 in the form of a finger 13.

14 designates a bifurcated bracket mounted within the main housing 1 on an adjustment-screw 15, that passes upwardly through the bottom of said housing for the reception of said bracket.

16 is a pivot-rod mounted in the bracket 14, and rockingly mounted on said pivot-rod is a dog 17. The dog 17 is provided with a notch 18 and an overhanging lip 19, the said notch being adapted to receive the free end of the finger 13 of the valve-carrying arm 10, so that said tongue will rest upon the end of said arm to retain the arm and hold the valve 9 to its seat 3. By adjusting the screw 15 it will be seen that the dog 17 may be drawn downwardly to effect a secure seating of the valve 9 to avoid any possibility of the ingress of water through the inlet 2 from the water-main to the main chamber 4 of the main housing. The rear end of the dog 17 is provided with a socket 20, which receives a link 21, pivotally mounted in the upper end of a pull-rod 22. The pull-rod 22 is provided with a valve 23, located intermediate of its ends and within the housing 1.

25 is a bushing that is seated in the bottom of the housing 1 and through which the pull-rod 22 operates, the bushing being provided at its upper end with a seat 26, adapted to receive the valve 23. The pull-rod 22 has a non-circular, preferably triangular, portion 24, which operates in the bushing 25 and provides for spaces between its sides and the circular wall of the passage-way through the bushing.

27 designates a bracket secured to the lower side of the housing 1 in proximity to the bushing 25 and the lower end of the pull-rod 22. This bracket is notched at 28 to provide a lower lip 29 and an upper lip 30.

31 designates a lever-rod that is pivoted at 32 near its inner end to the lower end of the pull-rod 22, and the inner end of which is adapted to seat in the notch 28 in the bracket 27, so as to rest upon the tongue 29, which forms the base of said notch. 33 is a weight carried by said lever-rod 31. The weight 33 is normally supported by means of suspension in the manner to be hereinafter described.

34 designates a drain-valve bushing extending through the bottom of the main-valve housing 1, through which the seepage-water that may from time to time become present in said housing finds egress.

35 is a drain-valve controlling the bushing 34 and pivoted to a rocker 36, that is swingingly mounted in lugs 37, projecting upwardly from the bottom of the main-valve housing, as seen in Figs. IV and V. The rocker 36 is provided with an arm 38, that extends into a position beneath the swinging arm 10, to which the main valve 9 is connected. When the swinging arm 10 is in lowered position to hold the main valve to its seat, the rocker-arm 38 is held depressed thereby, and the drain-valve is held elevated from its seat to permit the egress of seepage-water through the bushing 34.

39 designates a drain-pipe leading from the pressure-chamber housing 5, and through which the water present in the system of distributing-pipes of a fire-extinguishing apparatus is drained subsequent to the discharge of water through said pipes during the existence of a fire, which is extinguished by such discharge. The drain-pipe 39 leads to a straightway-valve housing 40, that has connected to it a discharge-pipe 41. In the valve-housing 40 are gate-valves 42 and 43, that control communication between a chamber 44 in the housing and the pipes 39 and 41. The valves 42 and 43 are operated by a valve-stem bearing a hand-wheel 45.

46 designates an air-box that has communication with the straightway-valve housing 40 through a drain-pipe 47. This air-box is connected with the distributing-pipes of the fire-extinguishing apparatus by an air-conducting pipe 48, which may lead from said pipes in any desirable location. The bottom of the air-box is closed by a base 49, that is preferably joined to the box by screw-threaded connection, as seen in Fig. II, and the upper surface of said base is corrugated, as seen at 50. 51 is a corrugated diaphragm, the edge of which is secured between the body of the air-box 46 and its base 49, so as to be securely held from displacement. The corrugations of the diaphragm 51 are adapted to lie in the corrugations of the air-box 49 when the diaphragm is in depressed position and held by the pressure of air thereagainst at its upper side, thereby avoiding stretching of the diaphragm, such as might otherwise result in the absence of such mating corrugations in the opposing parts referred to.

52 designates a slide-pin that passes through the air-box base 49 and is provided with a head 53 at its upper end, positioned centrally beneath the diaphragm 51. The pin 52 carries a block 54, preferably of elongated shape, as seen in Figs. I and II, and at the lower side of said block is a strip 55 of any hard smooth substance, but preferably of glass.

56 designates drop-hangers attached to the air-box 46 and supporting cross-bars 57.

58 designates guide-pins projecting upwardly from the cross-bars 57 and by which the pin-carried block 54 is directed in its vertical movement to prevent rotation thereof.

59 designates a pair of dogs supported by pivot-pins 60, mounted in the cross-bars 57 beneath the pin-carried block 54. Each of the dogs 59 is provided at its upper end with a nose 61, upon which the strip 55 at the bottom of the block 54 normally rests. The lower portion of the dogs 59 constitute socket-arms 62, which are provided with handles 63.

64 is a ball-shaped supporting member that rests in the socket-arms 62 of the dogs 59 and is furnished with a stem 65. The stem 65 of the supporting member 64 is loosely connected to the weight 33, hereinbefore mentioned, by a link 66. (See Figs. I and II.)

In the practical use of my valve connected to a system of fire-extinguishing apparatus distributing-pipes pressure medium is delivered from said distributing-pipes into the air-box 46 and constant pressure exerted against the diaphragm 51 in said box to maintain the valve-controlling parts in the position illustrated in Fig. II. Under normal conditions the main valve 9 is therefore held in a closed position, and the pressure medium entering the pressure-chamber 6 from the distributing-pipes is excluded from the main chamber 4 of the valve-housing. In the event of a fire occurring in the vicinity of one of the closure appliances of the distributing-pipes that are subject to being opened through the influence of heat and any such appliance or appliances are opened the pressure medium in the distributing-pipes becomes reduced by escaping therefrom. As a result, the pressure in the air-box 46 is lowered, and resistance against the upper side of the diaphragm 51 is reduced. The weight 33 is therefore permitted to overcome the pressure medium that previously held the block 54 against the dogs 59, by which said weight is supported. At such time the weight 33 causes the socket-arms 62 of the dogs 59 to be swung outwardly from each other, while their noses 61 ride inwardly beneath the plate 55 at the bottom of said block 54 to permit the escape of the ball-shaped weight-supporting member 64. The weight 33 thus becomes freed and descends, swinging pivotally on the pin 32, by which its lever-rod 31 is connected to the pull-rod 22. As the outer end of the lever-rod 31 descends its inner end positioned in the notched bracket 27 beyond the pivot-pin 32 moves upwardly to the upper lip 30 of said bracket, against which it impinges to cause the lever-rod to exert leverage upon the pull-rod 23 and carry it downwardly in the swinging of said lever-rod. By this construction a strong leverage action upon the pull-rod 22 is occasioned to effect its descent in a quick and positive manner. In its downward movement the pull-rod 22 carries therewith the outer end of the dog 17, to which it is connected by the link 21, and the inner end of said dog is moved away from the finger 13 of the swinging main-valve-carrying arm 10, thus freeing said arm to permit the pressure of water against the main valve 9 to unseat said valve and permit the ingress of water into the main housing-chamber 4. From the chamber 4 the water rises to the check-valve 7 and unseating said valve enters the pressure-chamber 6 to pass therefrom into the system of distributing-pipes that are connected to said pressure-chamber housing. After the weight 33 has been released in the manner stated it hangs suspended from the pull-rod 22 and serves to hold the valve 23 of said rod onto the seat 26 of the bushing 25 to prevent the leakage of water through said bushing from the main chamber 4. Immediately upon the freeing of the swinging arm 10 the drain-valve 35 in the housing 1 moves to its seat and prevents the egress of water therepast during its flow to the distributing-pipes of the fire-extinguishing apparatus. It will be understood that under normal conditions the valves 42 and 43 in the housing 40, situated in the drain-pipes 39 and 41 and to which the drain-pipe 47 leads, are normally closed, so that flow of water from the pressure-chamber 6 of the valve is prevented through said drain-pipes when the water enters said chamber to flow to the distributing-pipes. After the fire has been extinguished and the water has been cut off from the supply-pipe leading to the valve-inlet 2 the valves 42 and 43 are opened, and the distributing-pipes are drained, as is likewise the air-conducting pipe 48, leading to the air-box 46.

I claim as my invention—

1. In an automatic valve, the combination of a housing having an inlet, a valve controlling said inlet, means for holding said valve to its seat, a weight having permanent connection to said valve-holding means, an air-box, a diaphragm in said air-box, means for supporting said weight, and means whereby said weight-supporting means is freed on the movement of said diaphragm, substantially as set forth.

2. In an automatic valve, the combination of a housing having an inlet, a valve controlling said inlet, a valve-holding member, means for engaging said valve-holding member, a weight having permanent connection to said valve-holding-member-engaging means, an air-box, a diaphragm in said air-box, means for supporting said weight, and means whereby said weight-supporting means is freed on the movement of said diaphragm, substantially as set forth.

3. In an automatic valve, the combination of a housing having an inlet, a valve controlling said inlet, a valve-holding member, means for engaging said valve-holding member, a weight having permanent connection to said valve-holding-member-engaging means, an air-box, a diaphragm in said air-box, means beneath said air-box for supporting said weight, a member located beneath said diaphragm for engaging said weight-supporting means, said last-named member being arranged for movement to free said weight-supporting means on the movement of said diaphragm, substantially as set forth.

4. In an automatic valve, the combination of a housing having an inlet, a valve controlling said inlet, a member holding said valve to its seat, means for engaging said valve-holding member, a weight connected to said valve-holding-member-engaging means, an air-box, a diaphragm in said air-box, a weight-supporting member, dogs for receiving said weight-supporting member, and a block located beneath said diaphragm for engaging said dogs to sustain said weight-supporting means, substantially as set forth.

5. In an automatic valve, the combination of a housing having an inlet, a valve controlling said inlet, a member holding said valve to its seat, means for engaging said valve-holding member, a weight connected to said valve-holding-member-engaging means, an air-box, a diaphragm in said air-box, a weight-supporting member, dogs for receiving said weight-supporting member, a block located beneath said diaphragm for engaging said dogs to sustain said weight-supporting means, and a bearing-strip for said dogs carried by said block, substantially as set forth.

6. In an automatic valve, the combination of a housing having an inlet, a valve controlling said inlet, a member holding said valve to its seat, means for engaging said valve-holding member, a weight connected to said valve-holding-member-engaging means, an air-box, a diaphragm in said air-box, a weight-supporting member, dogs for receiving said weight-supporting member, a block located beneath said diaphragm for engaging said dogs to sustain said weight-supporting means, and a glass bearing-strip for said dogs carried by said block, substantially as set forth.

7. In an automatic valve, the combination of a housing having an inlet, a valve controlling said inlet, a member for holding said valve to its seat, means for engaging said valve-holding member, a weight connected to said valve-holding-member-engaging means, an air-box, a diaphragm in said air-box, a movable member located beneath said diaphragm, a weight-supporting member located beneath said movable member, and dogs for receiving said weight-supporting member and having their upper ends positioned beneath said movable member, substantially as set forth.

8. In an automatic valve, the combination of a housing provided with an inlet, a valve controlling said inlet, a dog for holding said valve to its seat, a pull-rod connected to said dog, a weighted lever pivoted to said pull-rod, intermediate of its ends, means in which the unweighted end of said lever fulcrums, and means for supporting the weighted end of said lever, substantially as set forth.

CAMPBELL B. SHAW.

In presence of—
E. S. KNIGHT,
M. P. SMITH.